(12) United States Patent
Naqvi

(10) Patent No.: US 10,698,930 B2
(45) Date of Patent: Jun. 30, 2020

(54) ASSIGNMENT OF APPLICATION (APPS) AND RELEVANT SERVICES TO SPECIFIC LOCATIONS, DATES AND TIMES

(71) Applicant: Shamim A. Naqvi, Morristown, NJ (US)

(72) Inventor: Shamim A. Naqvi, Morristown, NJ (US)

(73) Assignee: Sensoriant, Inc., Cedar Knolls, NJ (US)

( * ) Notice: Subject to any disclaimer, the term of this patent is extended or adjusted under 35 U.S.C. 154(b) by 0 days.

(21) Appl. No.: 14/466,676

(22) Filed: Aug. 22, 2014

(65) Prior Publication Data
US 2015/0058355 A1    Feb. 26, 2015

Related U.S. Application Data

(60) Provisional application No. 61/868,707, filed on Aug. 22, 2013.

(51) Int. Cl.
*G06F 16/00*       (2019.01)
*G06F 16/31*       (2019.01)
(Continued)

(52) U.S. Cl.
CPC ............ *G06F 16/328* (2019.01); *G06F 16/29* (2019.01); *G06F 16/3344* (2019.01);
(Continued)

(58) Field of Classification Search
CPC ............ G06F 16/9537; G06F 16/3344; G06F 16/951; G06F 16/345; G06F 16/328; G06F 16/29
(Continued)

(56) References Cited

U.S. PATENT DOCUMENTS 7,013,149 B2 * 3/2006 Vetro ...................... H04L 29/06
                                                           370/328
7,315,826 B1    1/2008 Guheen et al.
(Continued)

FOREIGN PATENT DOCUMENTS

WO    2011/161303 A1    12/2011
WO    2013187935 A1     12/2013

OTHER PUBLICATIONS

Eugeny Morozov, "To Save Everything, Click Here: The Folly of Technological Solutionism" Public Affairs, 2013, 6 pages.
(Continued)

*Primary Examiner* — Jean M Corrielus
(74) *Attorney, Agent, or Firm* — Stuart H. Mayer; Mayer & Williams PC

(57) ABSTRACT

A system and method is presented that extracts snippets form web pages according to specially designed logic. The extracted snippets might be made relevant to, i.e., indexed by, a location and time/day applicability. Such snippets may be thought of as apps or services that are defined only when a mobile terminal is in a pre-defined geographical area at a certain time and day (e.g., as defined by a calendar of events). Extracted snippets are stored and made searchable. Methods and a system are described to control the display of snippet search results. Snippets may be selected by user or by programmed logic and executed on the mobile terminal or in remote servers without the need to download the app or source code associated with the snippet.

15 Claims, 4 Drawing Sheets

(51) Int. Cl.
*G06F 16/34* (2019.01)
*G06F 16/33* (2019.01)
*G06F 16/9537* (2019.01)
*G06F 16/951* (2019.01)
*G06F 16/29* (2019.01)
*G06Q 10/10* (2012.01)

(52) U.S. Cl.
CPC .......... *G06F 16/345* (2019.01); *G06F 16/951* (2019.01); *G06F 16/9537* (2019.01); *G06Q 10/1093* (2013.01)

(58) Field of Classification Search
USPC .................................. 707/746, 706
See application file for complete search history.

(56) References Cited

U.S. PATENT DOCUMENTS

| | | | |
|---|---|---|---|
| 7,702,760 B2* | 4/2010 | Latvakoski | H04L 29/12113 709/217 |
| 7,752,539 B2* | 7/2010 | Kopra | G06F 17/30026 715/203 |
| 7,810,153 B2 | 10/2010 | Perlin et al. | |
| 7,994,981 B1 | 8/2011 | Farrokhi et al. | |
| 8,688,726 B2* | 4/2014 | Mahajan | G06F 17/3087 455/456.1 |
| 8,826,013 B1 | 9/2014 | Kodukula | |
| 8,831,994 B1* | 9/2014 | Hoffman | G06F 21/6218 705/50 |
| 9,063,811 B2* | 6/2015 | Stekkelpak | G06F 9/44505 |
| 2002/0160766 A1 | 10/2002 | Portman et al. | |
| 2004/0073490 A1 | 4/2004 | Shah | |
| 2004/0153548 A1* | 8/2004 | Latvakoski | H04L 29/12113 709/228 |
| 2004/0203851 A1* | 10/2004 | Vetro | H04L 29/06 455/456.1 |
| 2005/0255839 A1* | 11/2005 | Perttila | H04M 1/7253 455/419 |
| 2006/0020483 A1 | 1/2006 | Hsu | |
| 2006/0178918 A1 | 8/2006 | Mikurak | |
| 2007/0010195 A1* | 1/2007 | Brown | H04H 60/73 455/3.06 |
| 2007/0050820 A1 | 3/2007 | Saarikivi | |
| 2007/0061198 A1 | 3/2007 | Ramer | |
| 2007/0061244 A1 | 3/2007 | Ramer | |
| 2007/0061245 A1 | 3/2007 | Ramer | |
| 2007/0073717 A1* | 3/2007 | Ramer | G06F 17/30864 |
| 2007/0073718 A1 | 3/2007 | Ramer | |
| 2007/0073719 A1 | 3/2007 | Ramer | |
| 2007/0171921 A1 | 7/2007 | Wookey et al. | |
| 2007/0198485 A1 | 8/2007 | Ramer | |
| 2007/0198656 A1 | 8/2007 | Mazzaferri | |
| 2008/0256054 A1 | 10/2008 | Saaty | |
| 2008/0281794 A1* | 11/2008 | Mathur | G06Q 10/10 |
| 2009/0177603 A1 | 7/2009 | Honiscid | |
| 2009/0300635 A1 | 12/2009 | Ferris | |
| 2010/0121705 A1 | 5/2010 | Ramer | |
| 2010/0232405 A1* | 9/2010 | Kikuchi | H04W 4/001 370/338 |
| 2011/0119351 A1* | 5/2011 | Tamura | G06F 17/30867 709/217 |
| 2011/0145076 A1 | 6/2011 | Ramer | |
| 2011/0302153 A1* | 12/2011 | Meretakis | G06F 17/30864 707/722 |
| 2012/0084349 A1 | 4/2012 | Lee | |
| 2012/0215755 A1* | 8/2012 | Kumar | G06F 17/30867 707/706 |
| 2012/0265811 A1 | 10/2012 | Bist | |
| 2012/0271548 A1 | 10/2012 | Koehler et al. | |
| 2012/0284247 A1* | 11/2012 | Jiang | G06F 17/30867 707/706 |
| 2012/0284256 A1* | 11/2012 | Mahajan | G06F 8/61 707/722 |
| 2012/0289788 A1 | 11/2012 | Jain | |
| 2012/0303412 A1* | 11/2012 | Etzioni | G06Q 30/06 705/7.31 |
| 2013/0024492 A1 | 1/2013 | Graff et al. | |
| 2013/0159996 A1* | 6/2013 | Lin | G06F 8/60 717/178 |
| 2013/0205243 A1* | 8/2013 | Rivera | G06F 3/04817 715/776 |
| 2013/0275230 A1 | 10/2013 | Sawyer et al. | |
| 2013/0317950 A1 | 11/2013 | Abraham | |
| 2014/0006129 A1* | 1/2014 | Heath | G06Q 30/0222 705/14.23 |
| 2014/0025540 A1 | 1/2014 | Henrickson | |
| 2014/0040226 A1* | 2/2014 | Sadhukha | G06F 8/61 707/706 |
| 2014/0089243 A1 | 3/2014 | Oppenheimer | |
| 2014/0129942 A1 | 5/2014 | Rathod | |
| 2014/0142949 A1 | 5/2014 | Newman | |
| 2014/0200991 A1* | 7/2014 | Wu | G06Q 30/0246 705/14.45 |
| 2014/0250433 A1* | 9/2014 | Stekkelpak | G06F 9/44505 717/176 |
| 2014/0379747 A1* | 12/2014 | Majumder | G06F 17/30864 707/769 |
| 2015/0039420 A1 | 2/2015 | Rao | |
| 2015/0058355 A1 | 2/2015 | Naqvi | |
| 2015/0127940 A1 | 5/2015 | Polehn et al. | |
| 2015/0310020 A1 | 10/2015 | Brav | |
| 2016/0357794 A1* | 12/2016 | Liang | G06F 17/30899 |

OTHER PUBLICATIONS

Hastie et al., "The Elements of Statistical Learning Data Mining, Inference, and Prediction", 32 pages. Second Edition, Springer, 2009.
Frederic Lardinois, "Google takes a new approach to native apps with Instant Apps for Android" May 19, 2016, 8 pages.
Barrett, "Google's Going to Make Downloading Apps an Afterthought", Nov. 19, 2015, downloaded at http://www.wired.com/2015/11/google-streaming-apps-search/, 4 pages.
Frost, James, "iBeacon in iOS 8 getting location based notifications, plus: FCC filing suggests Apple to launch own iBeacon hardware", published Sep. 2, 2014, retrieved from: http://www.macworld.co.uk/news/iosapps/apples-plans-for-ibeacon-hardware-new-ios-8-location-notifications-3542708/ (4 pages total).
Rich McCormick, "Android Instant Apps are now available for limited testing", dated Jan. 24, 2017, 2 pages.

* cited by examiner

|  | Cal | Loc | Dev | Browser | Link | Code | Display | Exec | Owner | Acc | Rel | ... |
|---|---|---|---|---|---|---|---|---|---|---|---|---|
| Snippet 237 | | | | | | | | | | | | |
| Snippet 343 | | | | | | | | | | | | |
| Snippet 452 | | | | | | | | | | | | |
| ... | | | | | | | | | | | | |

FIG. 5

ASSIGNMENT OF APPLICATION (APPS) AND RELEVANT SERVICES TO SPECIFIC LOCATIONS, DATES AND TIMES

FIELD OF THE INVENTION

The present invention relates generally to displaying large number of web services so that consumers may be able to navigate to the relevant parts in less time with less effort.

BACKGROUND

The Internet/web has enormous amounts of content that is readily available to consumers. Websites contain large amounts of information or provide services that help consumers. Consumers may also download applications ("apps") that provide specific services. Several search engines exist that assist consumers in finding websites and apps/services that are relevant to their needs. However, a basic assumption of such systems is that the consumer is assumed to have some idea of what they are seeking. Such a priori knowledge may not be available in certain situations. In other cases, despite having such a priori knowledge, a consumer may not have downloaded an app that is relevant to his current and immediate needs in a certain situation. Therefore, it is of commercial and consumer benefit to satisfy the informational and service needs of consumers who find themselves in unknown and unanticipated situations.

SUMMARY

A web page is the fundamental unit of discourse in the forthcoming disclosure. A website is a collection of one or more web pages accessible from a single address, or location, on the Internet by standard intermediation by a web server.

In accordance with one aspect of the invention a method is provided that de-constructs a web page into its constituent blocks, called "snippets," and constructs one or more relationships between the various snippets.

In accordance with another aspect, the invention de-constructs a web page into one or more snippets based on recognizing visual boundaries and visual demarcations such as borders, copyright notices, column dividers, etc., or syntactical constructs that are pre-defined on the source code of the web page, and constructs one or more relationships between snippets from a single web page or from multiple web pages.

In accordance with another aspect, the invention de-constructs a web page into snippets by utilizing, in a collaborative fashion, web crawling systems such as Lucene, Scrapy, Nutch, etc., to analyze the web page.

A distinction is to be noted. There are many known examples wherein a new web page is constructed by analyzing a plurality of web pages. We are discussing a process wherein a single web page acts as a progenitor of a plurality of snippets, i.e., the former is a many to one relationship whereas the latter is a one to many relationship.

In accordance with another aspect the invention establishes a hierarchical relationship between the snippets extracted or derived from a web page, said relationship captures which snippets contain other snippets as sub-objects and which snippets are at the same, higher or lower hierarchical order.

In accordance with another aspect the invention utilizes specially designated, pre-determined syntactical constructs to demarcate snippets in the source code of web pages.

In accordance with another aspect the invention associates geographical locations and time/day of applicability to extracted snippets.

In accordance with another aspect the invention makes extracted snippets available to a snippet accumulation component by using a "push" method of transmission.

In accordance with another aspect the invention allows a searchable index of snippets to be built by allowing vendors and service or app providers to "push" content into a searchable index.

In accordance with another aspect the invention stores the derived snippets in a data store, maintaining its association with the original web page, i.e., an index is maintained that identifies which snippet is associated with which web page. Furthermore, associations between the contents of the snippet and its sub-components are maintained in the designated data structure.

In accordance with another aspect the invention utilizes technologies to scale the storage to a large number of snippets and web pages, e.g., by using multiple and redundant storage systems, servers, replication technologies, storage arrays, etc.

In accordance with another aspect the invention stores online trending information and associates said information with stored snippets.

In accordance with another aspect the invention stores usage of snippets indexed by their geographic location applicability and time/day of applicability.

In accordance with another aspect the invention utilizes machine-learning technology to assign a ranking function and control the display of search results on a mobile terminal.

In accordance with another aspect the invention utilizes usage statistics of snippets, geographical location applicability, time/day applicability, current online trending information as aspects or features in a collaborative filtering technology of a machine learning system.

In accordance with another aspect the invention requires that user mobile terminal reports its geographical location periodically to a snippet discovery component (SDC), said SDC constructing possible movement-related contexts for said consumer. Movement related contexts describe characteristics of the movements of consumers, e.g., if a consumer is stationary, moving at a certain rate, is lingering near another location, has repeatedly returned to a location, etc.

In accordance with another aspect the invention stores user movement contexts for later usage, said storing being indexed by snippets used by the consumer.

In accordance with another aspect the invention utilizes the stored movement contexts to train a machine learning function to predict what snippets are most relevant to a consumer in a given movement context.

In accordance with another aspect the invention allows a snippet's geographic area of applicability to be defined with respect to a well-known or historic landmark.

In accordance with another aspect the invention determines how a snippet is to be displayed, e.g., as a logo or rendered as a video clip, etc., by considering the contents of display constraints enunciated by information stored in the data structure holding the snippets.

In accordance with another aspect the invention determines what snippets can be displayed or prevented from being displayed in conjunction with other snippets based on constraints enunciated by the data structure holding the stored snippets.

In accordance with another aspect the invention constructs web pages to display snippets (hereinafter referred to as snippet pages) by utilizing style sheets, formatting information, templates, color charts, branding information and advertising content from the associated web page providers or from third party providers.

In accordance with another aspect the invention delivers one or more snippet pages to a consumer device a priori to the consumer device making a snippet search request.

In accordance with another aspect the invention moves snippet pages to server and storage sites, i.e., points of presence locations, that are proximate to the location of the consumer's terminal (e.g., a mobile terminal such as a smartphone. tablet, laptop, etc.)

In accordance with another aspect the invention causes the snippet pages to be delivered to the consumer terminal periodically, indexed by user location, snippet location of applicability, snippet time/day applicability, online trending context, snippet usage statistics at a certain geographic location, etc.

In accordance with another aspect the invention causes a consumer terminal to receive the snippet pages and one or more user selectable icons to be displayed on the requested web page. Furthermore, the display of the user selectable icon(s) may be contemporaneous with an audible alert message rendered on the consumer's terminal.

In accordance with another aspect the invention causes the snippet pages to be rendered on the consumer terminal in response to the consumer selecting the user selectable icon. Furthermore, said rendering may alternatively or additionally be triggered by specific audible sounds, verbal commands, or haptic gestures executed by the consumer.

In accordance with another aspect the invention renders the snippet pages as overlays on the associated web page being displayed on the consumer terminal.

In accordance with another aspect the invention renders the snippet pages in a third dimension with respect to the two-dimensional display of the associated web page.

In accordance with another aspect the invention renders the snippet pages within a holographic display with respect to the associated web page.

In accordance with another aspect the invention renders the snippet pages on a second display of the mobile terminal, i.e., the mobile terminal has two or more display screens.

In accordance with another aspect the invention renders the snippet pages on displays associated with the mobile terminal, e.g., displays that are proximate to the mobile terminal, or display devices where the same consumer has a currently authenticated session.

In accordance with another aspect the invention renders the snippet pages as a "star field" in which the snippets initially are displayed as small "dots" and as the user engages in a search for the relevant snippet(s), the star field zooms in gradually to show more detail of the snippets.

In accordance with another aspect the invention allows the use of trending information from external sources to be used to find relevant snippets and control the display and ranking function of snippet search results.

In accordance with another aspect the invention renders the snippet pages in a preferential order, one by one, e.g., a playlist of snippet pages. Furthermore, the method allows the consumer to control the preferential display of the snippet pages, to alter the rate of display, stop the display at a certain snippet page, terminate the display of the snippet pages, revert to a previously displayed snippet page, reverse the display order, etc., said control being exercised by audible or verbal commands or haptic gestures.

In accordance with another aspect the invention causes the current context to be selected by utilizing audible, verbal commands or haptic gestures. Furthermore, gestures may be defined to operate on the plane of the third dimension used to display a snippet page, e.g., intercept the plane of the third dimension.

In accordance with another aspect the invention causes consumer input to be accepted by a snippet page in the current context of the consumer device. In particular, the method allows a consumer to invoke a procedure, e.g., launch a command, delineated on the snippet page. Furthermore, said invocation may cause a new web page or new snippet page(s) to be fetched and/or displayed as a result of the invocation.

In accordance with another aspect the invention uses the software code or app associated with a snippet to be executed by a command issued by the consumer.

In accordance with another aspect the invention allows the consumer to bookmark a snippet page. Furthermore, it allows a consumer to re-load one or more previously bookmarked snippet pages.

In accordance with another aspect the invention executes the app or source code associated with a snippet in the user mobile terminal browser without downloading the app or source code.

In accordance with another aspect the invention executes the app or source code associated with a snippet in an execution environment distinct from the user mobile terminal, and displaying the results of the execution in a browser running on the user terminal, thus obviating the need to download the app associated with the snippet.

In accordance with another aspect the system and methods of the present invention provide the functionality and constitute a new kind of repository (e.g., an "app store") in which apps do not need to be downloaded prior to their use. Rather, apps are discovered contextually as and when needed and discovered apps are executed in a safe and secure environment external to the mobile terminal and its memory space or within the memory of the mobile terminal. The user of such an app store is freed from anticipating the future need of an app and uses services and apps by discovering them contextually as and when needed.

In accordance with another aspect the invention provides system and methods to enable ICDs to be contextually discovered and utilized either through their web pages or via their discovery broadcasts. Additional information about a discovered ICD, e.g., its control API, may be obtained by recourse to a Directory Server. Information pertaining to ICDs that is received is packaged as snippets, stored and made searchable.

In accordance with another aspect of the invention a discovered ICD may be commanded to perform a service, said command being issued by a consumer by interacting with the snippet page corresponding to the discovered ICD, said snippet page being returned to the consumer as a result of a posited search request.

In accordance with another aspect of the invention systems and methods are provided that provide the functionalities and constitute a search engine for ICDs, sometimes also known in common parlance as the Internet of Things. In such an embodiment the system and methods provided allow the dynamic discovery of Internet resources, e.g., devices, and their capabilities such as control APIs, etc. Such resources are discovered as and when needed by consumers using their mobile terminals, such discovery being contextual by being related to the geographical location of the resource, the consumer terminal, the online context, the current time/day, etc. When discovered a consumer may initiate an interaction with said resource by issuing commands using a control API specific to the discovered resource. The computational processes and resources triggered by or launched by the user command may utilize the memory space and resources of the mobile terminal or utilize the memory and computational resources of external computing and storage elements (accessed online through a network connection).

BRIEF DESCRIPTION OF THE DRAWINGS

FIG. 5 shows one example of an internal data structure that may be used to store the snippets received by the snippet storage component.

DETAILED DESCRIPTION

Introduction

Figure 1:
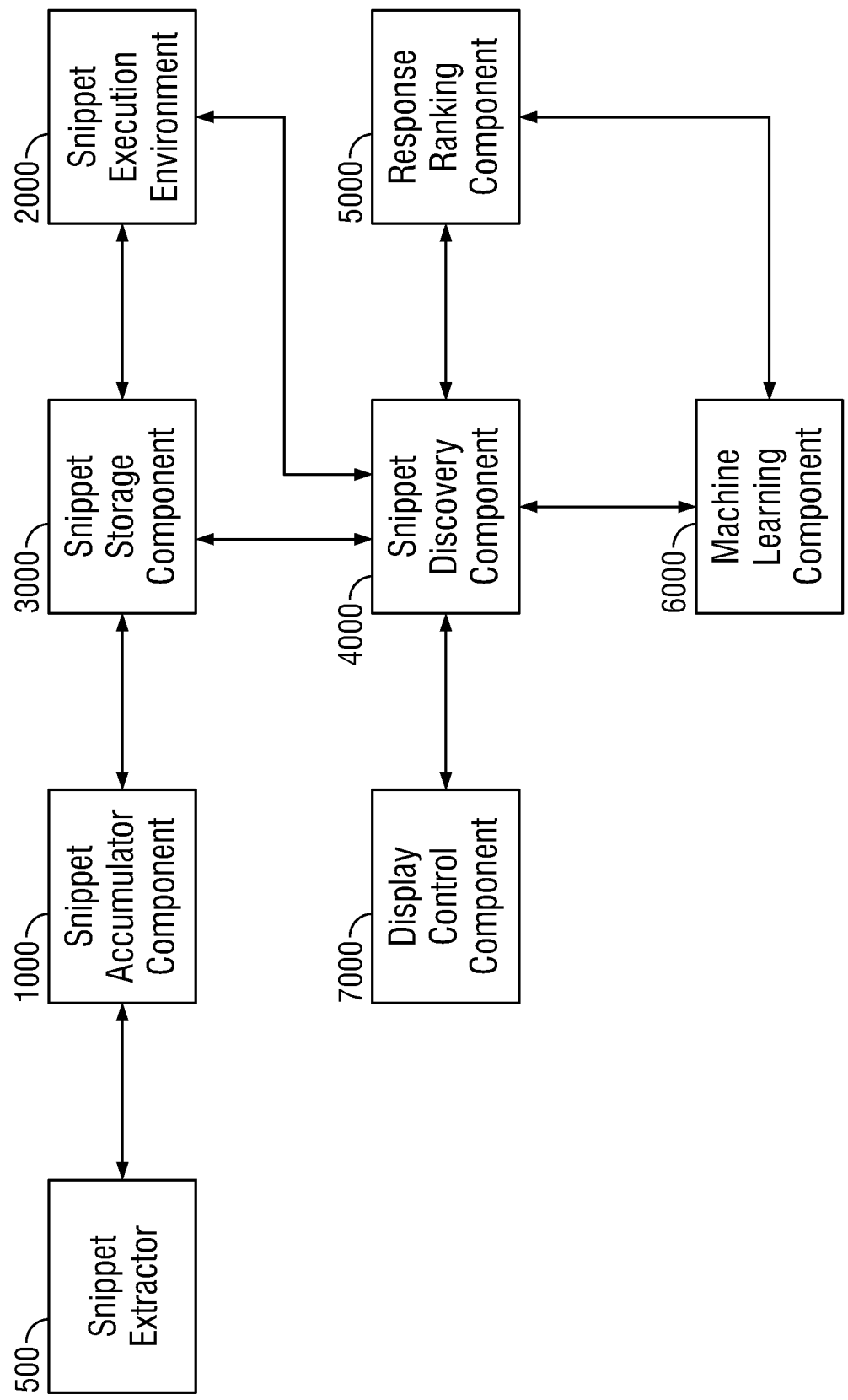
FIG. 1 shows one example of a snippet extraction and discovery system constructed in accordance with the present invention.

App stores have been very popular with mobile consumers. Consumers routinely download hundreds of apps on to their mobile devices and use these apps during their daily lives. A central assumption in this area of technology is that a consumer has anticipated a need and downloaded a relevant app before he can use said app. In other words consumers must have a priori knowledge that they will need said app. Given that there exist hundreds of millions of apps it is not feasible to download all apps for every possible eventuality, even if we could predict all that may confront us in our daily lives. It is also true that we often find ourselves in unknown circumstances, new locales, and unfamiliar and unanticipated situations. It is then pertinent for a consumer to ask, is there an app suitable for the present situation?

In recourse a consumer who finds himself in an unfamiliar situation may engage in a web search by using a search engine. Hundreds of millions of web pages exist containing a wealth of information. Consider a consumer carrying a mobile terminal, e.g., a smartphone, tablet, laptop or other such portable communication device that is able to communicate over a fixed and/or wireless network such as the Internet or other wide area network. The consumer, upon finding himself in need of an unanticipated service, wishes to search for available services in his current location at the current time. For example, the consumer may be at Yankee Stadium on game day and wishes to find services that enable him to seek out the shortest line for buying game souvenirs. Present day search engines provide location-specific search mechanisms but these are not indexed by location synchronized with time and day, e.g., events defined by a calendar such as the Yankees game calendar for a given season.

It may be possible for a consumer to issue several search requests, each individually geared to getting a collection of responses that loosely pertain to his original search criteria. For example, the consumer may issue a request for services available in the general vicinity of Yankee Stadium. He may then proceed to issue requests for services available on game day. Then the consumer may find items that are common between the former and the latter group of answers and sort through them to find services that interest him or that may be relevant. A common feature of many mobile terminals is the limited size of their displays. It is generally infeasible on a small display terminal with limited abilities to save interim search results to perform the sort of iterative computation that is described above. It would be much more feasible for a consumer to simply issue a single search request "shortest line service here and now" that returns responses that are specific to the location and time associated with the service.

In other words, the commonly used term "user context" in search technology may be extended to denote the location of the mobile terminal, current time at the location of mobile terminal, the social networking context (what is relevant to the consumer at this time and place according to his social network), the web context (what web page content is relevant to the consumer at this time and location), and any terms provided by the consumer himself. The user context is then used to derive responses to a search request that is continuously (in a sense described later) issued to a system that responds, said responses being capable of being displayed either by consumer commands or by policy control, said policy dictated by consumer or derived from past behavior of consumer by said system.

To summarize, the present state of the art in web search and mobile app technology fails to teach how to respond effectively to search requests of mobile users who wish to ask, what services are available here and now? Or, Is the service XYZ available here and now? Or, what apps are relevant here and now? The term "effectively" identifies a solution that does not require the user to engage in iterative and detailed computations requiring the usage of saved interim search results, e.g., actions that are infeasible to be carried out on small mobile devices.

Overview

FIG. 1 shows one example of a snippet extraction and discovery system constructed in accordance with the present invention. A "snippet" is a portion of a web resource that most often, but not exclusively, identifies the resource, its address, main functionalities and use/purpose, mode of usage, etc. Examples of web resources include but are not limited to web pages, websites, Internet Connected Devices (ICDs), apps, web services, etc. Usually but not exclusively snippets pertain to services, apps or devices that are associated with a geographical location, called the geographic applicability of the snippet. Also, snippets are most often associated with services, apps or devices that are associated with a time and day event as in a calendar. These associations are called time/day applicability. In some cases a type of ICD often referred to as a "beacon" may serve to identify a location that in turn may be used to define the location of a service/app and, thus, become a part of a snippet that describes said app/service. The term "beacon" refers to small transmitting devices such as those manufactured by Qualcomm (called Gimbals), or defined by Apple (called iBeacons), and manufactured and identified by other companies. Beacons are physically installed at geographic locations where they trigger apps and/or the OS of smart phones and other mobile terminals that are proximate to an installed beacon and which have registered to receive beacon signals.

A snippet extractor 500 component extracts certain specific parts of web resources as dictated by special-purpose hardware and software logic. In some cases the snippet extractor 500 receives device information from web pages pertaining to ICDs that have been installed in various geographic locations, such devices being described by their corresponding web pages, websites or web directories, i.e., web resources. In other cases, smart phones, tablets, etc., (collectively referred to as mobile terminals) that are proximate to ICDs/beacons receive broadcast or transmitted information from said devices and relay it to the snippet extractor. The snippet extractor 500 may use known techniques taught in discovery protocols. The snippet extractor 500 converts received device information, consulting a Directory Server as needed (not shown in FIG. 1), into snippets. Thus, the mobile terminals may be utilized to "mine" geographical installed ICD/location information.

Information pertaining to a web resource may also be "pushed" by the authors/owners of said resource to the snippet extractor 500 or the snippet extractor 500 may seek and find web resources using its own internal logic. When using push to send information to the snippet extractors, said task may be simplified and aided by providing authoring tools, messaging tools, widgets etc. to facilitate the task of the authors.

The extracted snippets are "pushed" to a snippet accumulator component 1000 by the snippet extractor 500. The snippet extractor 500 accumulates said snippets and stores them in a specially designed snippet storage component 3000, which serves as a user searchable data structure. Thus, the data store is built up by receiving information sent by the snippet extractor 500. This data store contains snippets that describe apps, services and ICDs. The snippets may thus be logically viewed as pieces of information pertaining to services, apps and ICDs, said pieces being assembled into a structured format and stored in a searchable directory.

It is expected that the number of apps, services and ICDs will continue to grow and the size of the data structure 3000 will need to be extremely large. Moreover, updates to services, apps and ICD capabilities will need to be accommodated. Thus, the data store, i.e., the snippet storage component 3000, needs to be scalable, reliable and distributed. Several technologies are taught by prior art to achieve these goals such as the Hadoop Distributed File System, Cluster Computing, and Resilient Distributed Datasets, for example.

The snippet storage component 3000 is searchable by a snippet discovery component (SDC) 4000. Most often, but not exclusively, the SDC allows mobile consumers to use their terminals to pose search requests to the snippet storage component via the Internet or other communications network. A typical inquiry may have the intent "What services, apps or ICDs are available here and now". Such inquiries may be posited by using a variety of input methods, including but not limited to keyword-based text searches, haptic gestures, clicking displayed icons, verbal commands, etc. In certain cases the SDC may work autonomously and pose inquiries under programmatic control, e.g., every few minutes, or displaying the latest results upon receiving an external trigger, or saving the results for a later time.

The snippet discovery component 4000 receives results from the snippet storage component and uses the display control component (DCC) 7000 to control the displaying of the results. The DCC 7000 dynamically coverts the received results into web pages referred to as snippet pages that are amenable to being displayed in conventional mobile web browsers. Because of the limited size of the display screens of many mobile terminals, the DCC may employ a variety of techniques and technologies to display the web pages. One such technique involves overlaying the snippet page onto a pre-existing web page that is being displayed on the screen of the mobile terminal. Another technique may be to display the snippet page as an object in the third dimension on a two-dimensional display. Another variant may be to display results using holographic techniques and technologies. The goal of such techniques is to display the snippet pages without erasing the previous content being presented on the screen. It is assumed that switching back and forth between screens of content may be cumbersome for mobile users. Alternatively, the snippet pages may be displayed on the mobile terminal screen for a few instants of time and then the original contents are displayed again, such an alternating display strategy being carried out a pre-determined number of times or until a command is received from the consumer.

In some embodiments snippet pages being displayed on the screen of a mobile terminal have all the functionalities of conventional web pages. Thus, they may be bookmarked, they may contain hyperlinks that can be clicked, they may contain commands that may be executed, etc. Again, a variety of techniques may be used to effectuate actions on the contents of the snippet pages, e.g., keyboard input, touch gestures, haptic commands, etc.

It is expected that the number of snippet pages containing the results of search requests may be very large. Mobile consumers typically find it cumbersome to peruse and consume information spread across several web pages on mobile terminals. In certain cases the snippet discovery component 4000 may consult a Response Ranking Component (RRC) 5000 to create a priority queue of the received answers. Such a priority queue may then be used to construct the snippet pages, said pages containing responses reflecting the ordering of the queue. The DCC 7000 may decide to, for example, only show the first few snippet pages, e.g., the first snippet page with the top ranked five (5) responses, etc.

The RRC 5000 may utilize various known techniques and technologies such as machine learning technology, for example, to rank order the snippets received as results to inquiries. In some embodiments the RRC has access to a machine learning component 6000 that uses various pieces of information in snippets as facets or features to train a system to discern the likes of a consumer at a given location and time/day. The learnt function is used to predict what snippets will be most useful to a consumer in a given situation (user context, online context, geographical and time/day applicability). In essence this amounts to asking what snippets were found to be most used in similar situations. These considerations result in curtailing the number of snippets needed to be included as results to an inquiry or to determine the rank ordering of the results. The main elements of this embodiment employ a "continuous" appeal to machine learning technology to predict what snippets (equivalently, what services, apps and ICDs) a consumer will like in a given "situation". The term "continuous" refers to an ongoing periodic activity, the period being determined by computational constraints. The term "situation" refers to the geographical location and the time/day when the inquiry is posed, in addition to the online trending information and any other user information available to the system and methods of this invention. Some embodiments use all such information as facets and features in a machine learning system to make predictions of user likes.

As has been stated above, snippet pages, when displayed, may be designed to have full functionality as conventional web pages. And as has also been stated above, since snippets correspond to services, apps or ICDs, displayed snippet pages may accept user commands and provide services to consumers. A consumer may thus click an object or icon on a snippet page and cause a computation to be initiated or launched. Such computations may be executed, for example, in the memory of the mobile browser running on the user's mobile terminal. The logic corresponding to such an execution may be obtained by the snippet by recourse to the snippet storage component 3000, e.g., the computation may execute as a conventional applet.

Alternatively, the computation may execute as a conventional Servlet in a distinct execution environment available to the snippet discovery component 4000 and shown as module 2000 in FIG. 1. The snippet execution environment 2000 is a secure environment where computations may be executed on behalf of consumers interacting with displayed snippets. In such cases, as snippets are associated with apps, no download of an app is necessary. Thus, the snippet discovery component 4000 and the display control component 7000, in particular, and potentially other components shown in FIG. 1, may together constitute a new kind of repository (e.g., an "app store") in which descriptions of apps are displayed on mobile terminals and users may interact with said descriptions by issuing commands. In such an app store apps need not be downloaded before their use. Rather apps are discovered contextually as and when needed, and discovered apps are executed to obtain results and derive services as and when needed. Thus the present invention proposes a fundamental departure from conventional app stores in which the downloading of apps is a fundamental precept.

As ICDs continue to be manufactured and installed it is expected that the number of such devices will continue to grow rapidly. In some embodiments the present invention caters to such devices by enabling the contextual discovery of such devices, either through their web pages or via their discovery broadcasts. Additional information about a discovered ICD may be obtained by recourse to a Directory Server (expected to be available as a part of the Internet infrastructure). All such information is received and packaged as a snippet, stored and is made searchable by the snippet discovery component 4000.

Snippet Extractor

Figure 2:
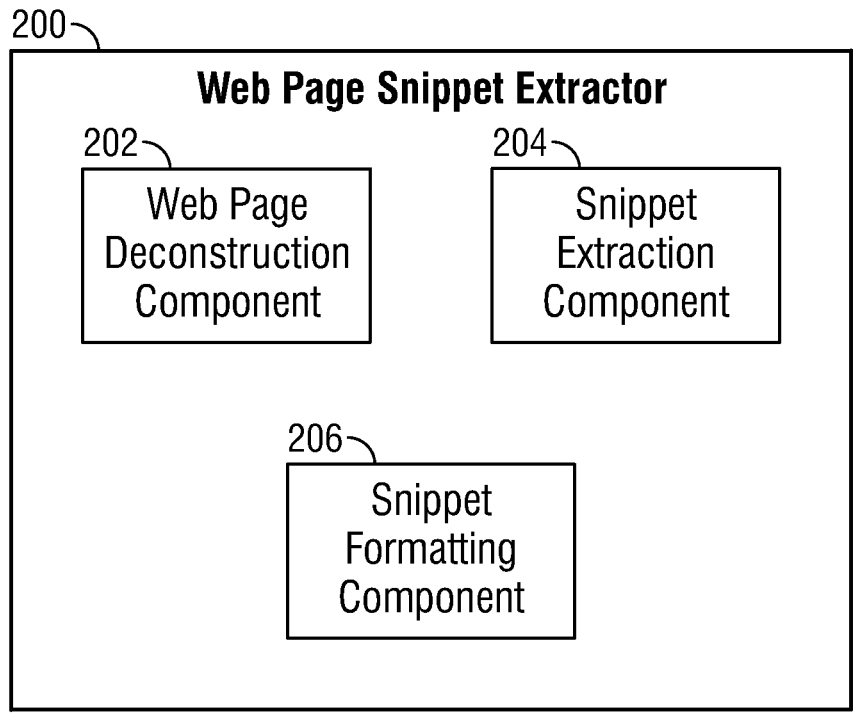
FIG. 2 is a block diagram of one illustrative exemplary web page snippet extractor for implementing an embodiment of the invention.

FIG. 2 is a block diagram of one illustrative exemplary web page snippet extractor 200 for implementing an embodiment of the invention. Web page snippet extractor 200 may be employed, for example, in the system shown in system 1. Of course, the invention is not limited to the methods and techniques described below, which for illustrative purposes only are described in terms of a web page having a structured format that is based on a Hypertext Markup Language (HTML) layout pattern. The HTML layout pattern may be located within the source code of each web page. Of course, other types of structured formats may be employed instead of or in addition to HTML.

Web page snippet extractor 200 may be or can include a server such as a workstation running the Microsoft Windows, Mac OS, Unix, Linux or other operating system or platform. In some embodiments, web page snippet extractor 200 may comprise one or more servers. Also in some embodiments, web page snippet extractor 200 may be incorporated into or otherwise associated with a search engine, although in general the web page snippet extractor 200 and the search engine may be separate entities operated by different parties. Although not shown in FIG. 2, web page snippet extractor 200 includes a communication interface that allows it to be connected to any other device directly or over a communications network such as the Internet with fixed or wireless links.

Web page snippet extractor 200 includes a web page deconstruction component 202, a snippet extraction component 204 and snippet formatting component 206. In some embodiments, web page deconstruction component 202, snippet extraction component 204 and snippet formatting component 206 are integrated into one component. In other embodiments the individual components may act as stand-alone components and may be connected to each other through a fixed and/or wireless communication network. The web page deconstruction component 202 is a computer hardware or software component with logic configured to identify the various sections of a web page. In the context of a web page having an HTML layout pattern, the various sections that are identified may be HTML elements located between HTML tags or tag patterns.

In some embodiments the web page deconstruction component 202 can also be configured to rank the sections of a web page based on the importance of each section. The web page deconstruction component 202 may assign a ranking value to each section that identifies the importance of the section. The ranking value may be a number, text word or phrase, character, symbol, or any other identifier that may be used to convey the importance of the section. Typically, the most important sections will receive the higher-ranking values. In an embodiment, the web page deconstruction component 202 can determine the importance of a section based on keywords found within the text of the section. In such an embodiment, certain keywords (words or phrases) may be weighted more heavily than others such that their presence may denote the importance of the section. In another embodiment, the web page deconstruction component 202 can determine the importance of a section based on the type of tag or tag pattern that is associated with the section. For example, sections, which have tags or tag patterns exactly matching those being searched by the web page deconstruction component 202, may be deemed more important than tags or tag patterns that do not exactly match those being searched. Accordingly, sections with exact match tag patterns may be assigned a lower ranking value. Likewise, sections that have tag patterns with a simple starting and ending sequence of tags may be treated as less important than other types of tag patterns. In yet another embodiment, a user determines the importance of a section manually. In yet other embodiments, specialized snippet tags may be developed for use by web page authors for the purpose of having their web pages properly parsed into snippets.

In one particular embodiment the web page deconstruction component 202 operates on pre-determined and pre-defined set of HTML tags or other such syntactic constructs that are pre-agreed between the system of the present invention and the web page authoring process. In this embodiment the web page snippet extractor 200 component may be provided to web page authors as a System Development Kit (SDK), a widget to be included on said web page under authorship, or as a software library to be used in web page construction. The snippet extractor locates said tags and selects the multimedia or other object (e.g., text, graphics, video clip, audio clip, source code, hyperlink to source code, etc.) within the syntactic boundaries of the tags. The selected object is then identified as a primary section of the web page. The web page deconstruction component 202 may identify one or more than one such primary sections of a web page.

In an embodiment a web page author adds location, time, calendar and other relevant details concerning the web page into the pre-determined HTML tags or agreed-upon syntactic constructs so that the stated information may be picked up by the web page deconstruction component 202 as a primary section.

The snippet extraction component 204 is a computer hardware and/or software component with logic configured to extract text, images and/or other information from the sections identified by the web page deconstruction component 202. The information is extracted for use as a snippet to be included in a searchable index (described later). In an embodiment, the snippet extraction component 204 determines which portion of each section to extract based on a ranking value of the portions and the relevance of the portion to the search query. For example, the snippet extraction component 204 may first examine the ranking values of each section provided by the snippet deconstruction component 202 to determine which sections of the web page are most important. The snippet extraction component 204 may then compute a relevance value by comparing, for instance, the keywords of the search query to the text of the different portions of each section to determine which portions are most relevant to the search query. In an embodiment, the relevance value may be based on whether the keywords of the search query match any portions of the text of a section. The snippet extraction component 204 can be configured to select a desirable portion of each section that has the highest-ranking value and relevance value with respect to the search query. Once the desirable portion of each section is selected, the snippet extraction component 204 can extract that portion as a snippet to be associated with that section of the web page.

In another embodiment the snippet extraction component 204 locates a primary section of the web page previously identified by the web page deconstruction component 202 and identifies said primary section as a primary snippet for said web page. If said page has more than one primary section, the snippet extraction component 204 identifies each such primary section as a primary snippet of said web page.

The snippet formatting component 206 is a computer hardware and/or software component with logic configured to generate, construct or otherwise provide snippets that may be accumulated into a searchable index (detailed later) using the snippets obtained by the snippet extraction component 202. The manner in which the snippets are formatted may be based on a number of factors, including, for instance, the relevance value of each snippet, the nature (e.g., size) of the display available to the end-user's terminal, etc. In an embodiment the snippet formatting component 206 uses the primary snippets identified by the snippet extraction component, formats them in accordance with a pre-determined set of formatting rules and makes said snippets available to the searchable index. For example, a primary snippet may be formatted as a 2048-byte message and transmitted via fixed and/or wireless links to the snippet accumulator component 1000 of FIG. 1.

It should be noted that in the example presented above, a snippet was assumed to be a subsection of an HTML element (i.e., a section between HTML tags or tag patterns). However, in some embodiments a snippet may be commensurate with the entirety of an individual HTML element. That is, each section identified by the web page deconstruction component 202 may constitute a single snippet. In such a case the web page deconstruction component 202, in effect, also performs the functionality of the snippet extraction component 202.

For instance, an individual web site (having multiple web pages) may be deconstructed into snippets. Likewise, an individual domain (having multiple web sites) may be deconstructed into its constituent snippets. Moreover, in some cases two or more sites belonging to different domains but having an association with one another (e.g., a business relationship) may be deconstructed into its constituent snippets.

While the present invention has been described in terms of an arrangement for deconstructing an individual web page into its constituent snippets, more generally the arrangement may be employed to deconstruct other entities into their constituent snippets. For example, in the case of deconstructing an individual domain such as the domain abc.com, the arrangement may extract one or more snippets from abc.xyz.com and one or more other snippets from abc.123.com. As a concrete example, snippets from two web sites selling two related products, such as a car and a watch (e.g., Bentley and Breitling) may be extracted and presented as a single snippet or two related snippets (said relationship explained later).

Snippet Accumulation Component

Figure 3:
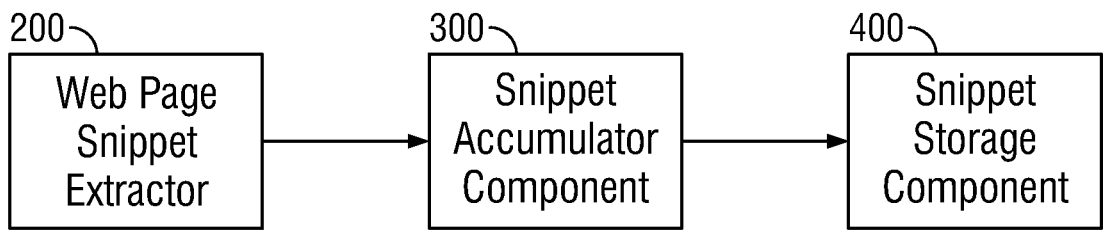
FIG. 3 shows one example of the web page snippet exactor, the snippet accumulation component and the snippet storage component.

FIG. 3 shows one example of the web page snippet exactor 200, the snippet accumulation component 300 and the snippet storage component 400. As previously mentioned, in some embodiments of the present invention snippets may be accumulated into a searchable index (e.g., snippet storage component 3000 in FIG. 1). The Web Page Extractor 200 in FIG. 2 takes one or more snippets as formatted by the snippet formatting component 206 and initiates a transmission to the Snippet Accumulation Component 300 in FIG. 3. In some embodiments it may be desirable to implement this transmission in a secure manner since the web page extractor 200 and the snippet accumulation component 300 may be operated by different entities. One example of such a protocol that may be employed is illustrated with reference to the flowchart of FIG. 4.

Figure 4:
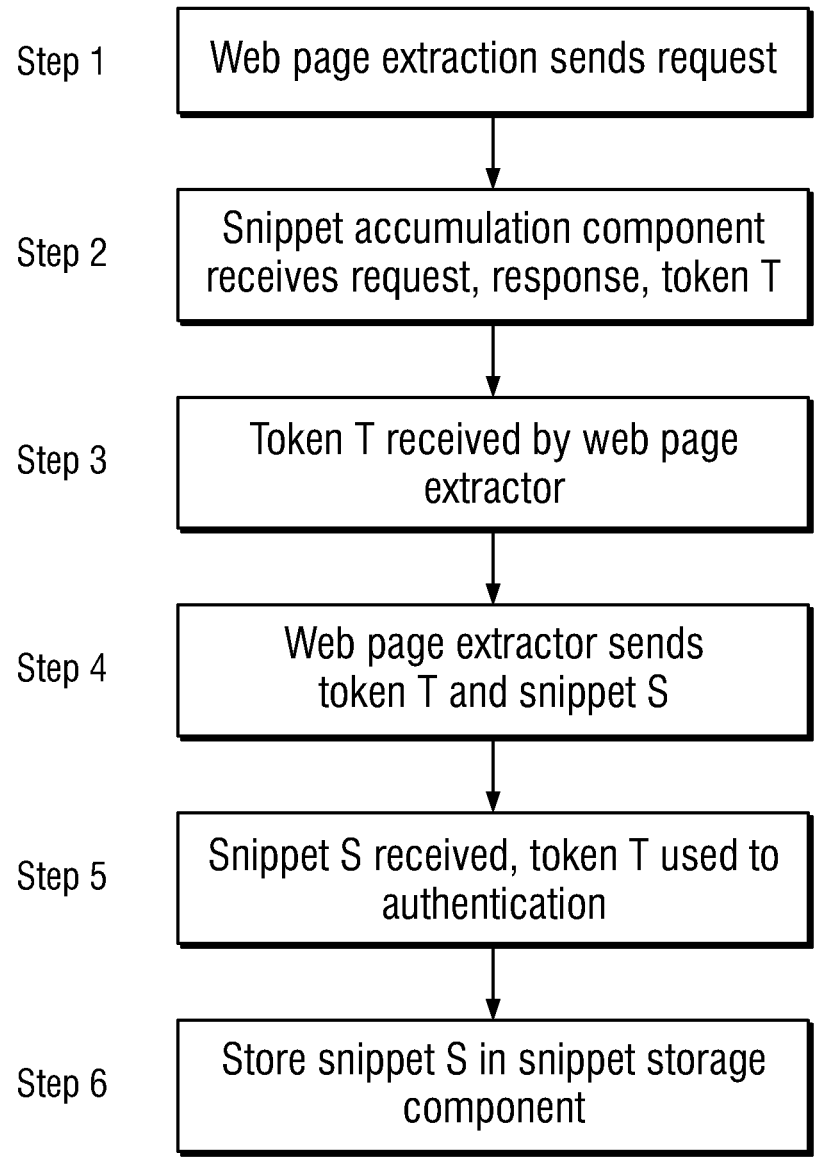
FIG. 4 is a flowchart illustrating one example of a secure communication protocol that may be employed between the web page extractor and the snippet accumulation component.

In step 1 of FIG. 4 the Web Page Extractor takes a snippet constructed by its Snippet formatting component (described above) and sends a message to the snippet accumulator component indicating that it wishes to send it a snippet.

In step 2 the Snippet Accumulation Component responds to said request with a unique security token or the like.

In step 3 the Web Page Extractor receives said unique tag and uses it to authenticate future messages.

In particular it uses (step 4) the unique tag to send the extracted snippet to the snippet accumulator component.

In step 5 the snippet is received and authenticated by the Snippet Accumulation Component.

In step 6 the received snippet is stored for later use in snippet storage component 400 (FIG. 3).

The above description uses a simplified example to delineate an illustrative protocol followed in sending, receiving and storing snippets resulting in the construction of a data store of snippets. In some cases conventional negotiation and handshake protocols may be employed. For example, the unique token may be generated and transmitted in a secure manner so as to avoid spurious requests. Of course, it is apparent that information other than a unique token may also be used in the protocol. For example, various attributes may be used to "signal" the type of content and formatting of the snippet, the kind of device recommended for display or execution of the snippet, etc. The communication between the Web Page snippet extractor 200, the Snippet Accumulation Component 300 and the snippet storage component 400 shown in FIG. 3 may occur over fixed and/or wireless links (not shown in FIG. 3) or these components may communicate over the Internet (not shown).

By way of example of prior art, SIP (Session Initiation Protocol) and SDP (Session Description Protocol) protocols may be employed, which describe extensive facilities for describing sessions, capabilities and negotiations between computing entities.

Snippet Storage Component

With continuing reference to the example in FIG. 3, the snippet storage component 400 receives snippets from the Snippet Accumulation Component 300 using a pre-determined protocol internal to the snippet storage component 400 and Snippet Accumulation Component 300. In this example the format of the received snippet is also pre-determined, pre-specified and known to both the snippet storage component 400 and the Snippet Accumulation Component 300. (The Snippet Accumulation Component described above may optionally re-format a received snippet according to its internal formatting rules.)

The snippet storage component 400 uses an internal data structure to store the received snippets. FIG. 5 shows an exemplary illustration of said data structure. The actual implementation of the data structure may vary according to the requirements of the invention.

FIG. 5 delineates the storage data structure as a table of rows and columns. Each row of the table corresponds to a stored snippet with a unique associated identifier and the columns contain various sub-components of the snippet. Only a few possible sub-components of the snippets are shown for pedagogical reasons. Some of the possible sub-components are described below.

The column "Cal" indicates a calendar entry that shows the dates and times of applicability of the snippet, i.e., when is the snippet capable of being executed.

The column "Loc" indicates the geographical location where the said snippet can be executed, i.e., each snippet is assumed to be localized to a given geographical region of a pre-determined size such as, by way of example, a circular region centered around a given location with radius 300 ft. The geographical points that define a region might be given by latitude and longitude, GPS coordinates, proximity to a well-known landmark (e.g., Yankee Stadium), etc.

The columns "Dev" and "Browser" refer to the recommended device and Internet Browser upon which said snippet might be executed.

The column "Link" denotes the hyperlink to the website from whence the snippet was extracted, i.e., received.

The column "Code" refers to another hyperlink to the location where the source code (if any) associated with said snippet is stored. It is envisaged by the present invention that the source code may be located in a location that is external or internal to the system comprising the present invention.

The column "Display" refers to any display-related constraints imposed by said snippet. For example, the snippet may specify that for terminals with small display sizes only the "logo" of the snippet may be displayed. Alternatively, in bandwidth-rich environments, e.g., if there is a WiFi connection available to the user terminal, the constraints may specify that a video clip may be rendered on the user terminal.

The column "Exec" refers to constraints on execution of the source code associated with the snippet. For example, authentication requirements or security concerns, etc., may be stated under this heading.

The column "Owner" refers to the information regarding ownership of snippet or contact information.

The column "Acc" refers to an accounting, billing and usage information repository.

The column "Rel" refers to other snippets that are related to said snippet and the nature of the relationship. The terms "related" and "relationship" are described in detail later.

As stated above the present invention envisages many more attributes, i.e., columns, as comprising the above data structure and only a few have been listed herein for exemplary purposes. Several examples of such attributes will be presented later.

In some cases the number of snippets that need to be stored may be extremely large (e.g., in the billions). Therefore, in some embodiments a distributed storage mechanism may be employed to hold all the data associated with the storing of snippets. Examples of such storage systems are the RDFS (Hadoop Distributed File System), possibly with RDD (Resilient Distributed Datasets) assistance implemented on large-scale cluster computing systems.

Relationship Between Snippets

As noted above, snippets from the same web page or domain, or from the same enterprise, or from different web pages might be inter-related. An example of such a relationship is provided by two snippets that may be "displayed" together, e.g., a wristwatch such as manufactured by Breitling and a Bentley automobile, i.e., the wristwatch in said case is associated with the automobile via branding by the two respective companies. As an alternative consider the snippet for Coca-Cola and Pepsi that may have a mutually exclusive display constraint.

The relationship between snippets is not limited to the display of snippets only; it may impact other behaviors associated with snippets. For example, two snippets may be related by mutually exclusive execution, e.g., two offers for a product may not be executed by the same consumer within a certain time limit, etc.

In some embodiments the present invention may capture snippet inter-relationships during the snippet extraction and identification phases (described earlier) and represent them in a special column in the snippet storage component 400. For example, the prime section identified by the snippet extraction component may contain information about such relationships as specified by the web page authors.

Snippet Discovery Component

The snippet discovery component (SDC) 4000 shown in FIG. 1 allows consumers to pose search requests against the data in the snippet storage component 3000. Thus, a search request such as "What services/apps are available here and now" may be responded to by searching the snippet storage component 3000 for all snippets matching the "here and now" specification, i.e., data, time and location constraints. It should be noted that while the search request above has been stated in English, this is merely for descriptive purposes. The present invention does not preclude the use of natural spoken language as an input mechanism, gesture-based inputs on touch sensitive surfaces, or "search box" type keyboard input systems or any other suitable input mechanisms. All of the above and other input methods may be used to specify consumer requests and one such mechanism is described later.

Furthermore, allowing the consumer to state additional information as a part of the request may increase the power of the search requests, e.g., "What services related to waiting lines are available here?" Or more succinctly as "waiting line services?"

While the present invention emphasizes the location and time of snippet based services and apps as a key point, it does not preclude the possibility that certain services may be defined via snippets that carry no location or calendar restrictions, i.e., such services or apps work everywhere and at all dates and times. For example, a Bank of America app may be defined as such a time and location-independent snippet. One method of stating such time and location-independent constraints is to declare a "don't care" value for the "Loc" and "Cal" columns in the snippet storage component data structure.

Many recent advances in Internet computing teach the extraction of trends from dynamic websites such as social networking sites, e.g., Facebook, and messaging sites such as Twitter and Instagram, etc. Such trends may be captured in the snippet storage component 3000 as well. In particular, in an embodiment when a consumer requests a search for a snippet, the resultant snippet(s) are remembered and the current trends are recorded when the search request was made. For example, assume that at certain time and location the Twitter trend comprises the hashtag #cold and that a consumer issues a search request to the snippet storage component 3000, resulting in snippet367 being returned as the response to the consumer request. The snippet storage component then stores the current trend #cold as a column attribute, e.g., "Trend", with snippet367. Thus, the trend #cold is associated with snippet367. In a later section the invention discusses the embodiment of "ranking" responses to consumer search requests based on correlating trending information.

As another example of a special-purpose column attribute that may be introduced into the snippet storage component 3000 consider a new attribute "Used" defined for, say, snippet367, that refers to a list of snippet identifiers that are most often used at said "Loc". In other words it is a list ordered by usage of snippets at the given location. For example, the value of the column attribute "Used" for row corresponding to snippet367 may be the list [{snippet322, 50}, snippet245,45}, . . . ] signifying that snippet245 was executed 50 times at said location, snippet 322 was executed 45 times at said location, etc.

Response Ranking Component

As discussed above, the present invention assumes that the number of snippets in the snippet storage component 3000 may be very large and, therefore, the possibility exists that the responses to consumer requests might be overwhelmingly large to "consume", particularly by mobile consumers with small display screens and those that are rushed for time.

In some embodiments we propose two different methods may be used as ranking functions, i.e., to sort the responses so that the most relevant are displayed first. The first method relates to the "Trend" column attribute described above. The second method relates to the "Used" attribute described above.

In both methods machine-learning technology may be used to derive strong correlations between snippets that are most frequently used by consumers in a given location and under given online trends. Known machine-learning technology shows how to take (large) data sets comprising user likes, dislikes, usage, etc., to predict what a known user would like, dislike, or use. For instance, many Internet websites use machine-learning technology to predict movies that a consumer might like, music that a consumer might enjoy, or a product that a consumer might purchase.

In the present invention machine-learning technology may be used as a ranking function, particularly using the attributes of past usage, current online trends, geographic location and calendar information where service or app is defined. Thus, the display function associated with a search request is correlated with certain attributes of the app or service and used to predict the likely app or services that are most relevant to a given consumer.

In some embodiments the present invention runs at a pre-defined and periodic rate for a consumer (or for all consumers), thus, "constantly" searching the current location of the consumer as said consumer moves in his daily routine. At periodic moments the services or apps available to the user are pre-computed and made ready for the consumer, i.e., the computation occurs in the background. If and when the consumer desires or if a pre-determined trigger is "sensed" by the mobile terminal then the pre-computed results might be made available to said consumer. Such computational processes that run periodically in the background may be implemented as a part of the OS of the mobile terminal, e.g., by modifying the launcher in the case of the Android OS, or by defining an app that is native to the mobile terminal OS.

User Movement Context

Currently available apps/services sometimes use user location data to provide location-specific information. Techniques for generating and receiving user locations from a mobile terminal are well-known. The present invention may use user location data to calculate and utilize user movements from user location data, said location data being generated by conventional means utilizing GPS or triangulation methods and technologies or by utilizing beacon registration messages, for example. (Because the beacons are installed at known specific geographic locations, when a mobile terminal is proximate to such a beacon and an app on said terminal is triggered, the app may communicate the triggered information to a server which may in turn determine the geographic location of the beacon and hence the mobile terminal itself.)

A user carrying a mobile terminal moving about a geographical location where beacons have been installed thus may said to be generating a series of registration and de-registration events on said beacons. (Equivalently, one may assume that the mobile terminal periodically transmits or makes available its location Using the elapsed time and location data as above, we may calculate many properties of the user's movements. For example, we may calculate how long a user spent between two consecutive locations. Moreover, if the spatial separation between said two locations is "small" compared to a reasonable transit time one may assume that the user stopped or "lingered" between the two locations. We may also calculate "return" trips wherein the user returns to a previously "visited" location. Other examples of user movement calculations include "repeat visits", "approaching a location", "exited a location X time units ago", "returned to a location within X time units", etc. Such user movement calculations may be called user movement context.

The user movement context may be utilized to infer user state, as for example in marketing situations, a user that is calculated to be "lingering" in close proximity to a retail item may be inferred to be interested in said retail item. Or if a user "returns" to the location of a certain retail item more times than a stated or calculated threshold may be assumed to be interested in said retail item. Similarly, a user that returns to the same location a number of times within a calculated number of time units may be assumed to be in need of geographical directions or assistance. Thus, there may exist a correlation between user movement context and user state. In other words the movements of a user may indicate his behavior in the physical world that in turn may indicate user intent or need.

In an embodiment of the present invention the user movement context of a user (as gleaned from registration/de-registration events or location reporting by his mobile terminal) is utilized to infer possible user intent and to utilize such information to influence said user intent, e.g., influence a user's purchase decisions. Said influence may be effectuated, for example, by transmitting or causing to be transmitted to the user, specific recommendations or advice as a function of his calculated user movement context.

In this context it is important to observe the recent use of Planogram protocols along with the use of beacons (mentioned earlier). Such protocols describe the layout, location and inventory of retail establishments. By way of example Table 1 below shows a fragment of such a protocol that describes a store that sells music. The first column gives the serial number of the installed beacon and its location coordinates are shown in columns 3 and 4. The second column gives the genre of the music stored at the beacon's location. The $5^{th}$ column gives the locations where users may be situated, i.e., these locations may be considered to be proximate to the beacon, ideally based on the signal strength of the beacon. (The latter locations can be determined by calculations involving the signal strength of the beacons as taught by prior art.)

Thus, if a user is situated at a certain location in the example retail establishment above the retail items contiguous or proximate to his location can be determined from the Planogram description. It may thus be ascertained, for example, that a user is situated proximate to the "dance and electronica" section. More precisely, the beacon messages received by the user's mobile terminal and conveyed to a server that causes a registration message to be generated. Analysis of such registration messages and the time of their receipt reveals user movement from which a context is calculated that gives various states of the user movement, e.g., a user is lingering, etc. Such user movement context may then be merged with Planogram information to determine that said user, by way of example, is lingering proximate to "dance and electronica" section.

TABLE 1

| b00000100 | classical | 435 | 290 | • (505, 370) |
| | | | | • (488, 462) |
| | | | | • (499, 372) |
| | | | | • (514, 203) |
| b00000101 | classic pop and rock | 656 | 290 | • (527, 200) |
| | | | | • (727, 188) |
| | | | | • (727, 384) |
| | | | | • (587, 377) |
| b00000102 | dance and electronica | 859 | 290 | • (924, 207) |
| | | | | • (795, 380) |
| | | | | • (922, 374) |
| | | | | • (922, 292) |
| b00000103 | folk | 1092 | 290 | • (1019, 377) |
| | | | | • (1092, 449) |
| | | | | • (1024, 367) |
| | | | | • (1024, 213) |
| | | | | • (1089, 99) |
| b00000104 | hip-hop | 435 | 673 | • (505, 574) |
| | | | | • (356, 587) |
| | | | | • (510, 751) |
| | | | | • (364, 574) |

The present invention in some embodiments is able to:
(1) Allow marketers to define several different kinds of user movements, e.g., linger, repeat visits, return visits, stationary users, rapidly moving users, etc;
(2) Store the user movement contexts in a table along with (retail and other) items that are proximate to where the user movement context occurred, possibly from a Planogram-style description protocol;
(3) Store the user's purchase decision and the snippet(s) he utilizes or chooses;
(4) Use the above data to calculate a correlation between the user movement context and the eventual purchase decision and snippet usage of the user;
(5) Use the correlation information from above to predict, given a certain user movement context at a certain geographic location, what the user is likely to purchase and what snippet the user is likely to need or want or choose in a given user movement context.

The invention allows the system to recall what snippets were used most often given a user movement context. This information may be used to display the most likely, predicted snippet, i.e., it may be used by the Response Ranking Function to rank order the responses to a search request.

Furthermore, the invention may allow use of the user movement context not only for retail establishments and retail purchase decisions but also in general for all kinds of purchase decisions involving products and/or services, e.g., travel or hospitality situations, or even general decisions such as inferring user intent, e.g., "user is in a hurry", "user is taking a walk", etc.

Display Control Component

Once a search request has been issued and the resulting group of snippets assembled as a response to the search request, it is the task of the Display Control Component (DCC) 7000 (FIG. 1) to arrange for the display of said results. It is envisaged that the DCC may utilize style pages, formatting tools, etc., to format the results as web pages, referred to as snippet pages that are capable of being displayed on a user terminal, e.g., by using an available Internet Browser.

Several display strategies are possible in addition to displaying search results as snippet pages. For example, the user terminal may have two displays and the snippet pages may be displayed on the second display. Alternatively, the snippet pages may be displayed as an overlay to the existing information being displayed on the user terminal display, e.g., in a third dimension, or as an overlay with a different color scheme, etc. It is anticipated that the snippet pages will need to be displayed fairly often, e.g., as the user moves around visiting various geographical areas and new apps and services will become continuously relevant to his needs. Thus, display strategies that do not "erase" or "obscure" what content may already be present on the display screen will be particularly effective. For example, the snippet pages may be displayed in a sequence alternating with the original contents of the screen.

The DCC may also allow user commands to determine what is displayed and to control items that are being displayed, Again, several different modes of user commands may be used, e.g., haptic gesture commands, verbal commands, etc. may be employed to control the display of snippet pages.

The user may desire to select a snippet that is being displayed and cause it to be executed. Again, the user using a variety of gesture-based inputs, verbal commands, or gestures on touch sensitive screens may control the selection of a snippet and its subsequent execution.

Snippet Execution Component

Once a group of snippets are displayed to a consumer, said consumer may select a link or otherwise execute a command available in one or more displayed snippets, thereby causing an externally defined object to be executed. One possible execution strategy would be to have the selected snippet be associated in the snippet storage component with the location of a corresponding app that might be then downloaded to the consumer terminal whence it might be executed.

In another embodiment the present invention employs a distinct component, the Snippet Execution Component 2000 (FIG. 1), where apps associated with snippets as identified by the snippet storage component 3000 are stored and proceed to execute, i.e., it is a controlled execution environment that uses the consumer's mobile terminal as a display device. More specifically, it is assumed that the mobile terminal is equipped with an Internet Browser and said app runs as a servlet in the execution environment with its results displayed via HTML5 browser renderings. In such implementations the column attribute "Acc" of the snippet storage component may be used to keep track of accounting and billing statistics.

In another embodiment the source code or the app associated with a snippet (as indicated by the snippet storage component) may be allowed to execute in a remote server, e.g., owned by the enterprise that owns the snippet and the results of the execution are displayed in the browser of the consumer mobile terminal. One method of implementing such a mechanism is to use remote procedure invocation technology.

In another embodiment the source code or the app associated with a snippet (as indicated by the snippet storage component) may be allowed to execute as an applet in the memory space of the browser running on the consumer's mobile terminal.

Performance and Other Considerations

As described above the present embodiment allows the calculation of correlations between user movement contexts and snippet usage. Using this information the system of the present invention may predict what snippets are most likely to be needed by a user in a given user movement context. This information may be used by the system to deliver a selected and chosen number of snippets to a user's mobile terminal even before the user issues a search request. Such delivered snippets are stored in the user mobile terminal's memory and provided as responses to the user if and when a user request is made. Thus, the system anticipates the search requests of the user and improves its performance by using such anticipation-based methods. This relates to "caching" strategies. The present invention provides the innovation of using the user movement context to provide hints of what information is to be cached at the mobile terminal or at Points-of-Presence (POPs) locations so that responses may be delivered to the user efficiently and quickly. The term "efficiently" not only refers to the improved efficiency of the search mechanism as far as the user is concerned (improved response time as experienced by the user) but also concerns the important function of efficient usage of network resources. In wireless networks in particular such pre-fetching of potential answers and caching them either in user mobile terminals or at POPs can significantly improve the utilization of (wireless) network resources.

Co-Existence With Traditional App Stores

As described above the present embodiment specifies systems and methods that allow the construction of a repository analogous to an app store in which the operability and discovery of apps is confined and constrained to specific locations, times, days and dates. Moreover, a user need not download said apps to a mobile terminal prior to their usage.

However, the aforementioned embodiment does not preclude a user from using conventional apps and app stores. A user may download apps he currently likes, store them on his mobile terminal and use them in a conventional manner. At the same time a user may also use the systems and methods of the present invention to use the apps and services described herein.

In particular, the invention envisages a modus operandi in which the user downloads conventional apps and uses them conventionally. Furthermore, a protected environment is provided for the kinds of apps described by the current embodiment. The protected environment may provide security, accounting and performance guarantees. Indeed enterprises may use the systems and methods of the current embodiment to create "walled gardens" providing their users with services that are specific to their locations, time and date, etc. As has been described above, apps and services may also be defined using the present embodiment that are operable and discoverable everywhere, i.e., they have no location, time, or day constraints. Thus, the present invention provides a co-existence mechanism between the conventional app stores and the app stores enunciated by the present embodiment. Moreover, enterprises may define a collection of services and apps utilizing the system and methods of the present invention, each such collection becoming a distinct, firewalled and protected app store. One method of defining such a collection would be to use the relationship function between snippets described earlier (cf. Snippet storage component and Relationship between snippets sections above). For example, all snippets related to XYZ Corp are treated as inter-related and belonging to one distinct app store.

Many users who utilize their mobile terminals for both personal and business or job related services and apps end up having to purchase and use two separate and distinct terminals. The present invention provides systems and methods for a user to use only a single mobile terminal and yet keep his apps and services in distinct app stores that are protected, private, separately accounted and billed, and firewalled.

Illustrative Operating Environment

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

Also, it is noted that some embodiments have been described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

The claimed subject matter may be implemented as a method, apparatus, or article of manufacture using standard programming and/or engineering techniques to produce software, firmware, hardware, or any combination thereof to control a computer to implement the disclosed subject matter. For instance, the claimed subject matter may be implemented as a computer-readable storage medium embedded with a computer executable program, which encompasses a computer program accessible from any computer-readable storage device or storage media. For example, computer readable storage media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). However, computer readable storage media do not include transitory forms of storage such as propagating signals, for example. Of course, those skilled in the art will recognize many modifications may be made to this configuration without departing from the scope or spirit of the claimed subject matter.

Moreover, as used in this application, the terms "component," "module," "engine," "system," "apparatus," "interface," or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediary components. Likewise, any two components so associated can also be viewed as being "operably connected", or "operably coupled", to each other to achieve the desired functionality.

What is claimed is:

1. A method for assigning apps and/or services to one or more specific locations, dates and times, comprising:
   extracting snippets from a web resource or from information received from a web resource, the snippets each including information concerning at least one app available from the respective web resources, the app only being operable at one or more specified locations, dates and times, the web resource including a web page, wherein extracting the snippets includes extracting the snippets by deconstructing the web page to recognize visual boundaries that are in source code of the web page; and
   after extracting the snippets, storing the information contained in the snippets in a searchable data structure that identifies the one or more specified locations, dates and times of operability of the app associated with the snippets, the searchable data structure being configured such that the app is only discoverable by searching the data structure with a communication terminal when the communication terminal is at one of the specified locations, dates and times.

2. The method of claim 1 further comprising obtaining the one or more specific locations using GPS coordinates, or by reference to a topological map, or by reference to or proximity to a geographical landmark, or by reference to a postal address, or by reference to an Internet connected device located at one of the specific locations or by reference to a beacon.

3. The method of claim 1 wherein assignment of the app to a specific location extends operability of the service to an extended region encompassing the specific location.

4. The method of claim 3 wherein the assigned app is communicated to distributed hardware and software internetworked components that collect said apps and services into a searchable index.

5. The method of claim 1 wherein at least one of the snippets further includes source code or a hyperlink to source code.

6. The method of claim 1 wherein the app is further only discoverable by searching the data structure with the communication terminal based on a current user context associated with the communication terminal.

7. A method for assigning apps and/or services to one or more specific locations, dates and times, comprising:
   extracting snippets from a web resource or from information received from a web resource, the snippets providing information concerning at least one app available from the respective web resources, the web resource including a web page, wherein extracting the snippets includes extracting the snippets by deconstructing the web page to recognize visual boundaries that are in source code of the web page;
   after extracting the snippets, storing data information contained in the snippets in a searchable data structure that identifies one or more specific locations, dates and times of operability of the app associated with the snippets, the app only being operable at the identified location, date and time;
   in response to a request received by the searchable data structure from a communication terminal located at one of the specific locations at a specific date and time, providing the communication terminal with only the snippets that are associated with an app that is available for operability at the one specific location at the specific date and time.

8. The method of claim 7 wherein, in response to a request received by the searchable data structure from a second communication terminal located at a given location at which no apps associated with the snippets are available for operability, providing the communication terminal with none of the snippets available in the searchable data structure.

9. The method of claim 7 wherein at least one of the snippets further includes source code or a hyperlink to source code.

10. A method for assigning apps and/or services to one or more specific locations, dates and times, comprising:
    extracting snippets from a web resource or from information received from a web resource, the snippets each including source code or a hyperlink to source code and information concerning at least one app and/or service available from the respective web resources, the app and/or service only being operable at one or more specified locations, dates and times, the web resource including a web page, wherein extracting the snippets includes extracting the snippets by deconstructing the web page to recognize visual boundaries that are in the source code of the web page; and
    after extracting the snippets, storing the information contained in the snippets in a searchable data structure that identifies the one or more specified locations, dates and times of operability of the app and/or service associated with the snippets, the searchable data structure being configured such that the app and/or service is only discoverable by searching the data structure with a communication terminal when the communication terminal is at one of the specified locations, dates and times.

11. A method for assigning apps and/or services to one or more specific locations, dates and times, comprising:
extracting snippets from a web resource or from information received from a web resource, the snippets including source code or a hyperlink to source code and providing information concerning at least one app and/or service available from the respective web resources, the web resource including a web page, wherein extracting the snippets includes extracting the snippets by deconstructing the web page to recognize visual boundaries that are in the source code of the web page;
after extracting the snippets, storing the snippets in a searchable data structure that identifies one or more specific locations, dates and times of operability of the app and/or service associated with the snippets, the app and/or service only being operable at the identified location, date and time;
in response to a request received by the searchable data structure from a communication terminal located at one of the specific locations at a specific date and time, providing the communication terminal with only the snippets that are associated with an app and/or service that is available for operability at the one specific location at the specific date and time.

12. A method for assigning apps and/or services to one or more specific locations, dates and times, comprising:
extracting snippets from a web resource or from information received from a web resource, the snippets each including information concerning at least one app available from the respective web resources, the app only being operable at one or more specified locations, dates and times, the web resource including a web page, wherein extracting the snippets includes extracting the snippets by deconstructing the web page to recognize visual boundaries that are in source code of the web page; and
after extracting the snippets, storing the information contained in the snippets in a searchable data structure that identifies the one or more specified locations, dates and times of operability of the app associated with the snippets, the searchable data structure being configured such that the app is discoverable by searching the data structure with a communication terminal when the communication terminal is at one of the specified locations, dates and times.

13. A method for assigning apps and/or services to one or more specific locations, dates and times, comprising:
extracting snippets from a web resource or from information received from a web resource, the snippets providing information concerning at least one app available from the respective web resources, the web resource including a web page, wherein extracting the snippets includes extracting the snippets by deconstructing the web page to recognize visual boundaries that are in source code of the web page;
after extracting the snippets, storing data information contained in the snippets in a searchable data structure that identifies one or more specific locations, dates and times of operability of the app associated with the snippets, the app only being operable at the identified location, date and time;
in response to a request received by the searchable data structure from a communication terminal located at one of the specific locations at a specific date and time, providing the communication terminal with the snippets that are associated with an app that is available for operability at the one specific location at the specific date and time.

14. A method of discovering apps, comprising:
receiving a request from a mobile communication device to identify apps that satisfy a user context of a user of the mobile communication device from which the request is received;
in response to the request, searching a searchable data structure, the searchable data structure storing snippets extracted from a web resource or from information received from a web resource, the snippets each being associated with at least one app available from the respective web resources, the searching identifying snippets associated with apps that satisfy the user context, the web resource including a web page, the snippets being extracted by deconstructing the web page to recognize visual boundaries that are in source code of the web page;
sending the identified snippets to the mobile communication device.

15. The method of claim 14 wherein the user context includes a location of the mobile device when the request is sent, the date and time when the request is sent and any terms specified by the user.

* * * * *